2,744,025

CELLULOSE ESTER COMPOSITIONS PLASTICIZED WITH POLYESTERS OF SUBERIC ACID

Charles P. Albus, Easton, Pa., and Donald E. Sargent, Schenectady, N. Y., assignors to General Aniline & Film Corporation, New York, N. Y., a corporation of Delaware No Drawing. Application November 16, 1951, Serial No. 256,816

5 Claims. (Cl. 106—179)

This invention relates particularly to cellulose esters plasticized with polyesters of suberic acid and ether glycols having from 4 to 6 carbon atoms.

Cellulose esters as such form hard, brittle cast films and molded articles. Molding powders are produced by blending plasticizers with cellulose ester powders at slightly elevated temperatures. The resulting powder then flows more freely due to the plasticizer to form combs, handles for kitchen utensils, boxes, toys, etc. when subjected to heat and pressure in a mold. Films cast from solvent solutions are more flexible and as a result more durable due to the addition of plasticizer. The most important properties a plasticizer should possess appear to be compatibility with the cellulose ether or ester, low volatility, and water resistance. If a plasticizer is not completely compatible in the proportions generally used with a cellulose ether or ester, the plasticizer will exude from the film or molded piece giving generally an opaque appearance and oily feel. Sometimes this occurs only after the article or film is allowed to stand. In either case, the cellulose ester reverts to its original hardness and brittleness. The same thing holds true of low boiling plasticizers. If they boil off slowly on standing or at temperatures to which the cellulose ester is subjected either in preparation or use, the cast film or molded article again becomes brittle and may easily crack or break. Films, lacquers, and molded articles may be subjected to water in their use. If the plasticizer is water soluble to even a small extent, the plasticizer is leached out of the cellulose ester which then becomes hard and brittle. Other properties which may be desired of a plasticizer will depend on the end use of the cellulose ester or ether. Some plasticizers will impart resistance to flammability, oils, greases, and weathering. For example, triphenyl phosphate is commonly used where fire resistance is desired. Some plasticizers discolor badly or oxidize to give off objectionable odors.

No one plasticizer seems to be a cure-all for defects in use. This is probably the reason why several hundred plasticizers have been suggested. However, the majority generally fail in one or more of the desired and necessary properties such as compatibility, low volatility, and water resistance.

The following are typical examples of various esters used for plasticizing cellulose esters and ethers:

Triacetin (glyceryl triacetate)
Dibutyl tartrate
Bis-methoxyethyl adipate
Methoxyethyl oleate
Triphenyl phosphate
Tricresyl phosphate
Methyl phthalyl ethyl glycolate
Dimethyl phthalate
Bis-methoxyethyl phthalate
Bis-butoxyethyl phthalate
Butoxyethyl stearate
Fish oil
Cottonseed oil
Linseed oil
Soybean oil The foregoing esters have not been accepted with complete satisfaction, however, because of their various defects. Triacetin and dibutyl tartrate have poor water resistance. Bis-methoxyethyl adipate is both water sensitive and rather volatile. Methoxyethyl oleate and butoxyethyl stearate are fatty acid derivatives and films plasticized with these materials are liable to a mildew type of fungi attack. Triphenyl phosphate has poor light stability and is likely to cause discoloration of cellulose acetate and nitrocellulose. Tricresyl phosphate has poor light stability, and also has the added defect of being rather toxic, especially if a large portion of the ortho isomer which is believed to be the toxic element is present. Methyl phthalyl ethyl glycolate appears to be rather volatile and water sensitive. It is also incompatible with cellulose acetate of 52% combined acetic acid content. Dimethyl phthalate is rather volatile and has a tendency at low temperatures to crystallize from films and other articles not only causing embrittlement but also a possibly partially permanent loss of transparency and whitening of the films and finished goods. Bis-methoxyethyl and bis-butoxyethyl phthalate appear to be fairly volatile when used as plasticizers for cellulose esters. Fish and cottonseed oils possess objectionable odors and are likely to become rancid on aging. Vegetable oils, such as linseed and soybean oil, have limited compatibility in ethyl cellulose, and exude when more than about 30–40% is incorporated as a plasticizer.

It has been found that the foregoing objections can be readily overcome by plasticizing a cellulose ether or ester composition with polyesters of suberic acid and ether glycols of 4 to 6 carbon atoms ranging in molecular weight from about 590 to 1100. Polyesters of this type when employed as plasticizers display outstanding properties in that they impart to the cellulose ether or ester composition greater elasticity and higher tensile strength. They are not affected by ultraviolet light and are stable to heat so that their volatility in the cellulose ether or ester composition is substantially negligible. In particular, they are compatible with any one of the commonly employed cellulose ethers and esters so that no air or water exudation of the plasticizer occurs. In addition to their compatibility, low volatility, and water resistance, they are odorless and do not impart any color to the plasticized cellulose ether or ester composition. The plasticizers hereinafter referred to as polyesters of suberic acid with ether glycols are obtained by the usual polyesterification procedure.

An acidic catalyst may be used but for most applications as a plasticizer, polyesterification in the absence of any added catalyst is preferable. The use of Nuchar decolorizing charcoal during the esterification or during the heating in vacuo materially improved the color of the product.

The suberic acid is commercially available and is derived from cyclooctatetraene by reduction to cyclooctene followed by oxidation, or from 1,6-hexanediol by conversion to 1,6-dichlorohexane which is reacted with sodium cyanide to yield suberonitrile, followed by hydrolysis to suberic acid.

The following are examples of suitable ether glycols containing 4 to 6 carbon atoms which are suitable for preparing polyesters of suberic acid as plasticizers for cellulose esters and ethers:

Diethylene glycol—HOCH₂CH₂OCH₂CH₂OH
Triethylene glycol—HOCH₂CH₂OCH₂CH₂OCH₂CH₂OH
Dipropylene glycol—CH₃CHOHCH₂OCH₂CHOHCH₃

Polyesters having excellent properties as plasticizers may be prepared from the above ether glycols and suberic acid alone. However, plasticizers having improved compatibility and greatly enhanced resistance to volatility and the leaching action of water are obtained when the above glycols are polyesterified with a mixture of suberic and other dibasic acid, such as succinic, glutaric, adipic, pimelic, azelaic, sebacic, etc., or a mixture of such acids, or a mixture of suberic acid and a monocarboxylic acid, such as, propionic, butyric, valeric, caproic, caprylic, etc.

A still further improvement in the polyester for use as a plasticizer results if monocarboxylic acids of 2 to 18 carbon atoms, such as acetic, propionic, butyric, caprylic, α-ethylcaproic, lauric, myristic, palmitic, stearic, etc. are used to end the chain by esterifying the free hydroxyl group or groups which may be present on the ends of the polyester chain.

The improved plasticizers for celluose esters and ethers prepared from the polyesterification of the ether glycols with suberic acid alone, mixtures of suberic acid and other dibasic acids, or mixtures of suberic acid with monocarboxylic acids will range in molecular weight from about 400 to about 3,000 as determined by the ebullioscopic boiling rise in acetone.

The polyesterification reaction consists of three steps, i. e., (1) initial esterification at atmospheric pressure, (2) heating in vacuo, and (3) chain-ending or acylation of end hydroxyl groups. It is carried out with an excess of ether glycol, i. e., from 20 to 100% excess to insure complete esterification. The dicarboxylic acid component may be suberic acid or mixture of suberic acid and other dicarboxylic acids. Furthermore, a monocarboxylic acid or a mixture of monocarboxylic acids may be incorporated in the initial esterfication mixture along with suberic acid or mixture of suberic and other dicarboxylic acid; or a monocarboxylic acid may be added at an intermediate stage in the initial esterification prior to heating in vacuo; or, finally, the monocarboxylic acid may be added after the initial esterification and after heating in vacuo, in which case the monocarboxylic acid acts as an acylating agent by reacting with the residual free end hydroxyl groups of the polyester.

The polyesterification is conducted at a temperature from 100° to 250° C. preferably at about 130° to 220° C. for at least 2 hours, with provision of an inert atmosphere, such as dry, oxygen-free nitrogen, and any suitable means for the removal of water as it is formed.

When an excess of ether glycol is used to prepare a polyester of suberic acid alone, the ester first formed will probably have the following general structure:

I        HOR₁OOCR₂COOR₁OH wherein R₁ represents the ether glycol residue, i. e., minus the OH groups and R₂ represents the (CH₂)₆ residue of suberic acid.

Further esterification will yield products having the general formula:

II 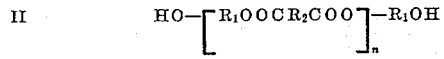

wherein R₁ and R₂ have the same values as above, and $n$ represents a numeral ranging from 2 to 20.

When a mixture of suberic and other dicarboxylic acids is employed in the esterification process with an ether glycol, the polyesters characterized by Formula II will contain mixed R₂ groups in the repeating unit which will depend upon the mole ratio of the acids used, the completeness of the reaction, etc.

When a mixture of suberic acid and a monocarboxylic acid is polyesterified with an ether glycol, the following polyester will result:

III 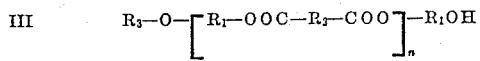

or

IV 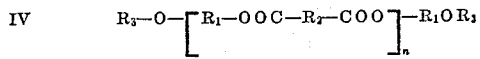

wherein R₁ and R₂ have the same values as above, and R₃ represents an acyl group of a monocarboxylic acid of 2 to 18 carbon atoms, and $n$ represents a numeral ranging from 2 to 20.

Polyesters characterized by Formulae II and III may be further treated with a monocarboxylic acid of 2 to 18 carbon atoms to end the chain by esterifying the free hydroxyl group or groups remaining on the polyester to give plasticizers for cellulose esters and ethers which will have greater water resistance and heat stability.

The following examples will serve to illustrate the process utilized in the preparation of the polyester plasticizers. All parts are by weight unless otherwise specified.

EXAMPLE I

*Polysuberate of diethylene glycol*

87 parts of suberic acid and 66 parts of diethylene glycol were charged into a 250 ml., 3-necked flask equipped with a stirrer, thermometer, take-off condenser and inlet for dry, oxygen-free nitrogen. After charging with nitrogen, the reaction mixture was heated at 150°–200° C. for 4 hours. The water as it was produced was removed by distillation. When most of the theoretical amount of water had been removed, 10 parts of Nuchar decolorizing charcoal were added to the reaction mixture and the mixture vacuum stripped at 150°–200° C. and 0.8 mm. during a period of 1 hour. After filtering the mixture to remove the decolorizing carbon, the product obtained was a yellow viscous liquid.

EXAMPLE II

*Polysuberate of triethylene glycol*

87 parts of suberic acid and 94 parts of triethylene glycol were charged into 250 ml., 3-necked flask equipped as in Example I. After purging with oxygen-free nitrogen, the reaction mixture was heated at 125–200° C. for 4 hours, removing the water as it formed. When most of the theoretical amount of water had been removed, 10 parts of Nuchar decolorizing charcoal were added to the reaction mixture and the mixture vacuum stripped at 150–200° C. and 0.8 mm. during a period of 1 hour. After filtering the mixture to remove the decolorizing carbon, the product obtained was a yellow viscous liquid.

EXAMPLE III

*Polysuberate of dipropylene glycol*

87 parts of suberic acid and 84 parts of dipropylene glycol were charged into 250 ml., 3-necked flask equipped as in Example I. After charging with nitrogen, the reaction mixture was heated at 125–200° C. for 4–5 hours. The water was removed by distillation as it formed. When most of the theoretical amount of water had been removed, 10 parts of Nuchar decolorizing charcoal were added to the reaction mixture and the mixture heated in vacuo at 150–200° C. and 0.8 mm. during a period of 1 hour. After filtering to remove the decolorizing carbon, the product obtained was a yellow viscous liquid.

EXAMPLE IV

*Polysuberate of mixed triethylene and dipropylene glycols*

A polysuberate of mixed triethylene and dipropylene glycols was prepared as described in Example III from 87 parts of suberic acid, 47 parts of triethylene glycol, and 42 parts of dipropylene glycol.

EXAMPLE V

*Polysuberate of dipropylene glycol chain-ended with α-ethyl caproic acid*

A polysuberate of dipropylene glycol chain-ended with α-ethyl caproic acid was prepared as given in Example III with the exception that after most of the water had been removed, the reaction mixture was stripped at 150–200° C. and 0.8 mm. for 1 hour and cooled to room temperature. 96 parts of α-ethyl caproic acid was added to react with the hydroxyl chain-ends, and the mixture was heated at 115–215° C. for 45 minutes. 10 parts of Nuchar decolorizing charcoal were added, and the mixture was heated in vacuo at 150–200° C. and 0.8 mm. for 1 hour, and finally filtered to remove the decolorizing charcoal.

The esters prepared as given above are compatible with all of the cellulose ethers and esters commercially used, such as cellulose acetate, cellulose triacetate, cellulose acetate propionate, cellulose acetate butyrate, cellulose nitrate, cellulose nitrate acetate, ethyl cellulose, benzyl cellulose, and the like. The esters may be incorporated into molding powders of cellulose ethers and esters or into solutions which are normally prepared for films, lacquers, dopes, and laminating solutions. The concentration or amount to be used as a plasticizer will depend, of course, on the type of cellulose ether or ester composition. The approximate amounts to be employed for any particular composition can be very readily determined by simple routine spot experiments. In general, however, the amount for molding powders may range from 20 to 40% of the powder, in solutions for films anywhere from 10 to 50%, in lacquers about 10 to 60%, in dopes from 40 to 100%, and in laminating solutions from 20 to 50%. All of these percentages are based on the weight of the cellulose ether or ester.

The following examples illustrate the application of the foregoing esters as plasticizers and the improved results obtained thereby when compared with currently used plasticizers.

EXAMPLE VI

A film of cellulose acetate of 5 mil thickness, containing 58.4 to 59% combined acetic acid, was prepared by casting the composition given below, containing various commonly used commercial plasticizers, on a clean, glass plate with a doctor blade, followed by air drying for 48 hours at room temperature at a controlled rate to prevent blushing of or other physical damage to the film. The film was then removed from the glass plate and further dried for 2 hours at 60° C. in the presence of freely circulating air.

| | Parts |
|---|---|
| Cellulose acetate | 15 |
| Plasticizer | 3 |
| Methylene chloride | 50 |
| Ethylene chloride | 22 |
| Absolute ethanol | 10 |

In like manner, films of the same thickness were prepared in which the plasticizers prepared as described above were substituted for the commercial plasticizers in the above composition. These films had excellent flexibility and clarity.

Samples of all of the films were placed in an air circulating oven for 24 hours at 100° C. In another instance, samples were immersed in water at room temperature for 48 hours, removed, rinsed with distilled water, and dried for 2 hours at 60° C. The superiority of films containing the plasticizers of this invention over similar films containing the various commercial plasticizers in resistance to loss of weight under this treatment is shown in Table 1.

TABLE 1

| Plasticizer | Percent Weight Loss of Film After 24 Hours at 100° C. | Percent Weight Loss of Film After 48 Hours in Water at Room Temperature |
|---|---|---|
| Dimethyl phthalate | 5.0 | 9.6 |
| Methyl phthalyl ethyl glycolate | 5.5 | 6.1 |
| Triacetin | 6.1 | 10.2 |
| Dibutyl tartrate | 7.0 | 9.6 |
| Diethylene glycol ethyl caproate | 6.9 | 8.5 |
| Methoxyethyl oleate | 6.6 | [1] 3.0 |
| Butoxyethyl stearate [2] | 8.6 | [1] 5.5 |
| Bis-methoxyethyl adipate | 9.4 | 15.8 |
| Polyester of diethylene glycol and suberic acid (M. W.—800) | 1.8 | 5.9 |
| Polyester of triethylene glycol and suberic acid (M. W.—1,100) | 0.9 | 6.7 |

[1] Film blushes; plasticizer exudes.
[2] Plasticizer mostly compatible.

EXAMPLE VII

A film of cellulose acetate butyrate of 5 mil thickness having an average acetyl content of 30% and butyryl content of 17.5% was prepared by casting the composition given below containing various commonly used commercial plasticizers on a clean, glass plate with a doctor blade, followed by air drying for 48 hours at room temperature at a controlled rate to prevent blushing of the film. The film was then removed from the glass plate and further dried for 2 hours at 60° C. in the presence of freely circulating air.

| | Parts |
|---|---|
| Cellulose acetate butyrate | 15 |
| Plasticizer | 3 |
| Methylene chloride | 50 |
| Ethylene chloride | 22 |
| Absolute ethanol | 10 |

In like manner, films of the same thickness were prepared in which the plasticizers prepared as described above were substituted for the commercial plasticizers in the given composition. Films of excellent flexibility and clarity were produced.

Samples of all of these films were exposed to freely circulating air in an oven for 24 hours at 100° C. and to the leaching action of water for 48 hours at room temperature. The superiority of films containing the plasticizers of this invention over those containing various commonly used commercial plasticizers in resistance to weight loss under these conditions is shown in Table 2.

TABLE 2

| Plasticizer | Percent Weight Loss of Film After 24 Hours at 100° C. | Percent Weight Loss of Film After 48 Hours in Water at Room Temperature |
|---|---|---|
| Dimethyl phthalate | 7.9 | 2.7 |
| Methyl phthalyl ethyl glycolate | 7.2 | 1.8 |
| Triphenyl phosphate | 5.2 | 0.3 |
| Triacetin | 9.7 | 3.6 |
| Dibutyl tartrate | 9.8 | 3.8 |
| Methoxyethyl oleate | 9.9 | 0.4 |
| Butoxyethyl stearate [1] | 8.1 | 0.5 |
| Bis-methoxyethyl adipate | 14.5 | 14.4 |
| Bis-methoxyethyl phthalate | 7.1 | 2.1 |
| Bis-butoxyethyl phthalate | 7.5 | 0.8 |
| Polyester of diethylene glycol and suberic acid (M. W.—800) | 0.7 | 3.3 |
| Polyester of triethylene glycol and suberic acid (M. W.—1,100) | 0.8 | 3.0 |
| Polyester of dipropylene glycol and suberic acid (M. W.—1,100) | 1.8 | 1.4 |

[1] Plasticizer not completely compatible.

We claim:

1. A composition of matter consisting essentially of a water-insoluble lower aliphatic ester of cellulose containing, in a plasticizing amount, a polyester of suberic acid with an ether glycol selected from the group consisting of diethylene glycol, triethylene glycol, and dipropylene glycol, said polyester being a liquid and having a molecular weight ranging from 590 to 1100.

2. A composition of matter consisting essentially of a water-insoluble lower aliphatic ester of cellulose, containing, in a plasticizing amount, a polyester of the class having the following general formulae:

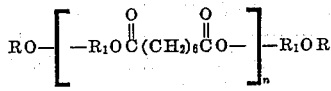

wherein R represents a member selected from the class consisting of hydrogen and acyl groups of saturated unsubstituted aliphatic monocarboxylic acids of from 2 to 18 carbon atoms, $R_1$ represents an ether glycol residue selected from the group consisting of $-CH_2CH_2OCH_2CH_2-$, $-CH_2CH_2OCH_2CH_2OCH_2CH_2-$ and

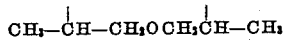

and $n$ represents an integer of from 2 to 20, said polyesters being liquids and having a molecular weight ranging from 590 to 1100.

3. A composition of matter consisting essentially of a water-insoluble lower aliphatic ester of cellulose containing, in a plasticizing amount, a liquid polysuberate of diethylene glycol having a molecular weight ranging from 590 to 1100.

4. A composition of matter consisting essentially of a water-insoluble lower aliphatic ester of cellulose containing, in a plasticizing amount, a liquid polysuberate of triethylene glycol having a molecular weight ranging from 590 to 1100.

5. A composition of matter consisting essentially of a water-insoluble lower aliphatic ester of cellulose containing, in a plasticizing amount, a liquid polysuberate of dipropylene glycol having a molecular weight ranging from 590 to 1100.

References Cited in the file of this patent

UNITED STATES PATENTS

| | | |
|---|---|---|
| 1,901,130 | Smith | Mar. 14, 1933 |
| 2,053,289 | Izard | Sept. 8, 1936 |
| 2,129,156 | Trolander et al. | Sept. 6, 1938 |
| 2,488,303 | Mack | Nov. 15, 1949 |

FOREIGN PATENTS

| | | |
|---|---|---|
| 364,807 | Great Britain | Jan. 14, 1932 |